(12) United States Patent
Sutrisna et al.

(10) Patent No.: US 9,722,467 B2
(45) Date of Patent: Aug. 1, 2017

(54) ARMATURE WINDINGS OF ROTATING ELECTRICAL MACHINES

(71) Applicant: KABUSHIKI KAISHA TOSHIBA, Minato-ku (JP)

(72) Inventors: Kadek Fendy Sutrisna, Yokohama (JP); Hiroaki Ishizuka, Tokyo (JP); Masashi Okubo, Kawasaki (JP); Toshiyuki Aso, Machida (JP); Takashi Ueda, Yokohama (JP); Kazuma Tsujikawa, Kawasaki (JP); Hideyuki Hachiya, Tokyo (JP); Daisuke Hiramatsu, Tokyo (JP); Toru Otaka, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 487 days.

(21) Appl. No.: 14/273,945

(22) Filed: May 9, 2014

(65) Prior Publication Data

US 2014/0333170 A1    Nov. 13, 2014

(30) Foreign Application Priority Data

May 10, 2013   (JP) .................................. 2013-100438

(51) Int. Cl.
*H02K 3/28* (2006.01)
*H02K 3/12* (2006.01)

(52) U.S. Cl.
CPC ................ *H02K 3/28* (2013.01); *H02K 3/12* (2013.01)

(58) Field of Classification Search
USPC ................................................ 310/179–210
See application file for complete search history.

(56) References Cited

U.S. PATENT DOCUMENTS

| 1,530,466 | A | * | 3/1925 | MacMillan | ............... | H02K 3/28 310/202 |
| 3,979,618 | A | * | 9/1976 | Auinger | ................... | H02K 3/28 310/198 |

(Continued)

FOREIGN PATENT DOCUMENTS

| CN | 2888735 Y | 4/2007 |
| CN | 102694433 A | 9/2012 |

(Continued)

OTHER PUBLICATIONS

JPO machine translation of JP 2009268233 A, Yonetani, Electric Motor and Power Supply Controller, All pages.*

(Continued)

*Primary Examiner* — Naishadh Desai
(74) *Attorney, Agent, or Firm* — Oblon, McClelland, Maier & Neustadt, L.L.P.

(57) ABSTRACT

According to one embodiment, there is provided armature windings of a rotating electrical machine, in which a 3-phase winding of two layers including upper and lower layers is constituted of phase belts having an electrical phase difference of 60° in between, pairs of upper coil pieces and lower coil pieces are contained in slots, the number of slots per pole per phase includes a fractional number, and a denominator thereof is an integral number greater than or equal to 4, wherein coil arrangement is carried out such that at least one coil piece in either of the upper or lower coil pieces included in two layers of upper and lower layers in one phase belt is replaced with a coil piece of an adjacent different phase.

6 Claims, 9 Drawing Sheets

(56) References Cited

U.S. PATENT DOCUMENTS

| | | | | |
|---|---|---|---|---|
| 5,231,324 A * | 7/1993 | Kawamura | H02K 3/28 | 310/184 |
| 5,982,068 A * | 11/1999 | Umeda | H02K 1/243 | 310/206 |
| 6,170,974 B1 * | 1/2001 | Hyypio | H02K 3/28 | 310/179 |
| 2003/0001450 A1 * | 1/2003 | Kazmierczak | H02K 3/12 | 310/184 |
| 2007/0114871 A1 * | 5/2007 | Imai | H02K 3/12 | 310/206 |
| 2011/0316454 A1 * | 12/2011 | Bouchez | H02K 3/28 | 318/139 |

FOREIGN PATENT DOCUMENTS

| | | | |
|---|---|---|---|
| JP | 4-27783 B2 | | 5/1992 |
| JP | 4-47551 B2 | | 8/1992 |
| JP | 7-106046 B2 | | 11/1995 |
| JP | 2009-268233 | | 11/2009 |
| JP | 2009268233 A | * | 11/2009 |
| JP | 2012205368 A | * | 10/2012 |
| JP | 2013176185 A | * | 9/2013 |
| JP | 2013236481 A | * | 11/2013 |

OTHER PUBLICATIONS

Combined Office Action and Search Report issued on Mar. 25, 2016 in Chinese Patent Application No. 201410191386.9 with English translation.

"Design of Three-phase electrical machine fraction slot winding", Electric Machine Technology, 3rd Period, Sep. 30, 1986, pp. 1-4.

Office Action issued on Nov. 24, 2016 in Chinese Patent Application No. 201410191386.9 (with English translation).

Office Action issued Nov. 29, 2016 in Japanese Patent Application No. 2013-100438 (with English translation).

Chinese Office Action issued May 17, 2017 in Chinese Application No. 201410191386.9 (6 pages).

\* cited by examiner

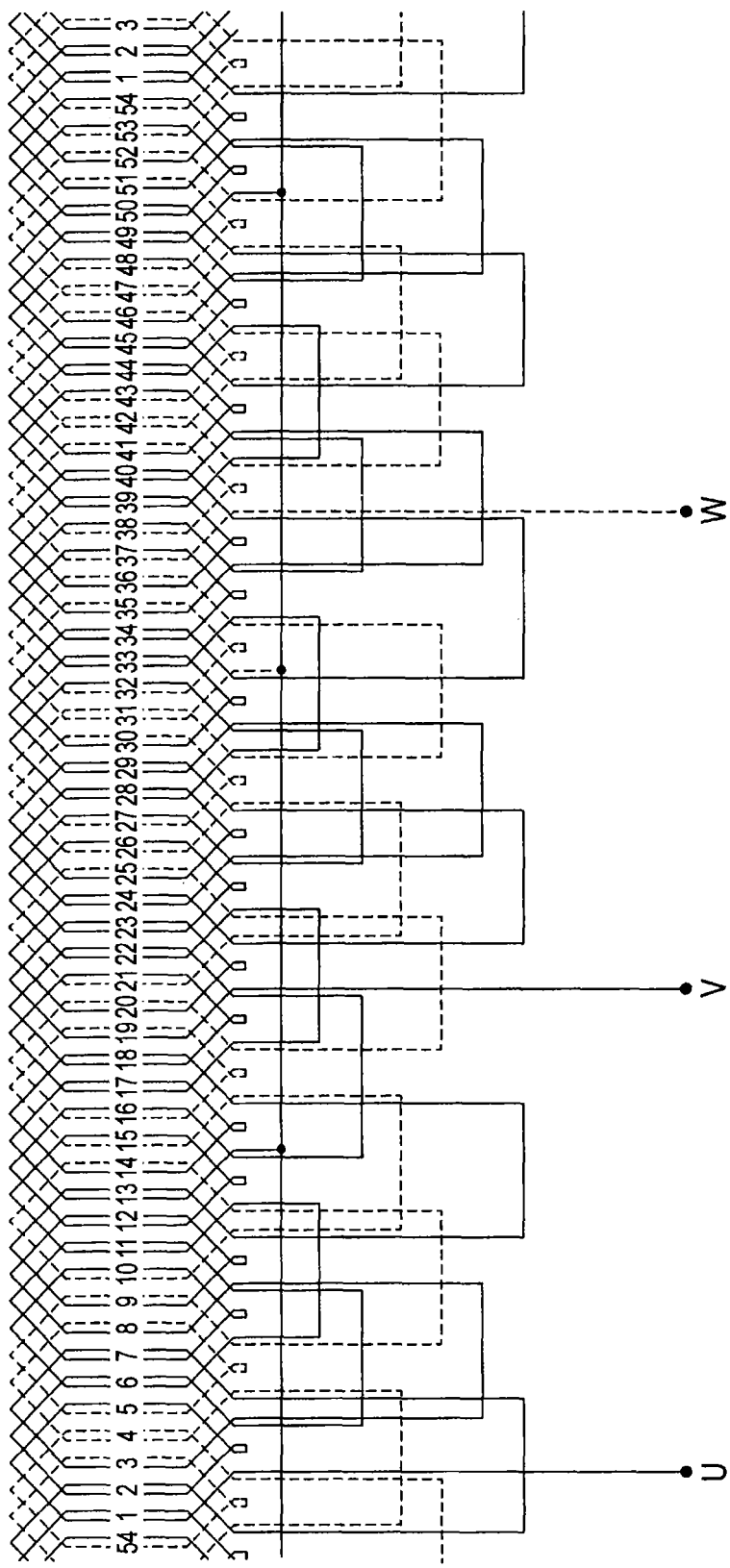
F I G. 5B

ARMATURE WINDINGS OF ROTATING ELECTRICAL MACHINES

CROSS-REFERENCE TO RELATED APPLICATIONS

This application is based upon and claims the benefit of priority from prior Japanese Patent Applications No. 2013-100438, filed May 10, 2013, the entire contents of which are incorporated herein by reference.

FIELD

Embodiments described herein relate generally to armature windings of a rotating electrical machine such as the synchronous machines or the like.

BACKGROUND

In general, in synchronous machines, when the number of slots is to be selected, the number of slots per pole per phase is often made in an integral number (hereinafter referred to as "integral-number slots"). On the other hand, from a viewpoint of formation of an improvement waveform, and flexibility of design, the number of slots per pole per phase is made in a fractional number (hereinafter referred to as "fractional-number slots") in some cases.

Although the fractional-number slots have an advantage that an excellent waveform can be formed, and a high degree of design freedom can be obtained, the number of slots per pole becomes unequal, and hence harmonics are generated in the armature magnetomotive force in addition to a fundamental wave. A harmonic magnetic flux caused by the magnetomotive force acts as an exciting force under certain circumstances, and becomes a cause of the vibration and noise of the armature core (stator core) in some cases.

For example, when fractional-number slots are applied to a multipolar machine (generally a machine with the number of poles of which is 8 or more) having a larger number of poles as can be seen in a hydroelectric power generation system, a harmonic called a sub-synchronous (or fractional) harmonic of a case where the number of slots per pole per phase (number of slots or coils per each pole per each phase), which is referred to as Nspp, includes a fractional number, and a denominator thereof takes a value (for example, 5 or 7) greater than or equal to 4 becomes liable to occur. A state where a frequency of the electromagnetic force based on such a harmonic and fundamental wave is close to a natural vibration frequency is called a resonance, and this becomes a cause of vibration of the armature core.

It should be noted that there is a case where coil arrangement is carried out by replacing one coil piece in a phase belt with a coil piece in an adjacent different phase for each of both upper and lower coil pieces. However, this arrangement method, which is called the interspersed one coil windings, is contrived to reduce the armature magnetomotive force of harmonics such as a fifth-order harmonic, seventh-order harmonic, and the like in the integral-number slots, and is not intended to reduce the harmonic, i.e., the sub-synchronous (or fractional) harmonic in the fractional-number slots.

Under the circumstances, it is desired to provide the armature windings of a rotating electrical machine capable of reducing a specific harmonic generated in fractional-number slots be provided.

BRIEF DESCRIPTION OF THE DRAWINGS

FIG. 2A and FIG. 2B are views showing coil arrangement and winding connection of the armature windings according to a first, conventional example;

FIG. 4A and FIG. 4B are views showing coil arrangement and winding connection of the armature windings according to a second conventional example; and FIG. 5A and FIG. 5B are views showing coil arrangement and winding connection of the armature windings according to a second embodiment.

DETAILED DESCRIPTION

Figure 1:
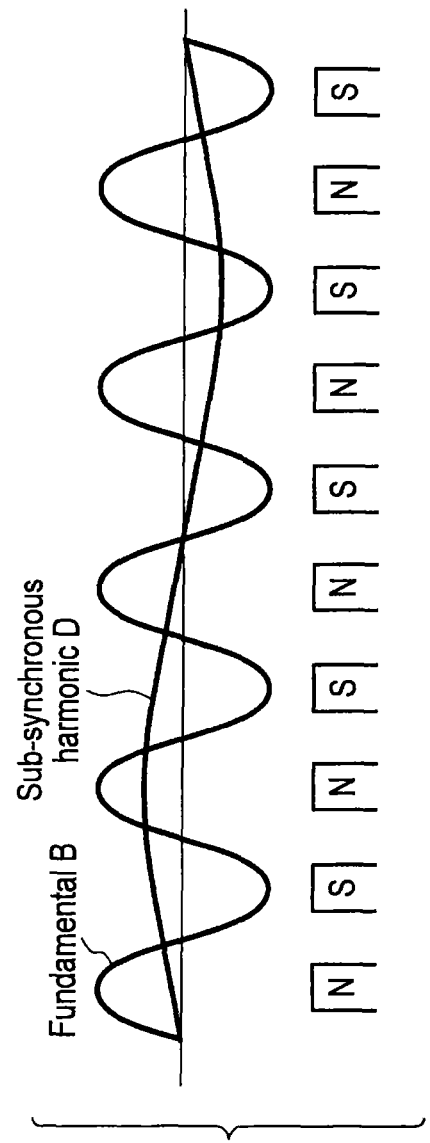
FIG. 1 is a waveform view showing a relationship between a fundamental wave and sub-synchronous (or fractional) harmonic.

In general, according to one embodiment, there is provided the armature windings of a rotating electrical machine, in which a 3-phase winding of two layers including upper and lower layers is constituted of phase belts having an electrical phase difference of 60° in between, pairs of upper coil pieces and lower coil pieces are contained in slots of an armature core, the number of slots per pole per phase includes a fractional number, and a denominator thereof is an integral number greater than or equal to 4, wherein coil arrangement is carried out such that at least one coil piece in either of the upper coil pieces or the lower coil pieces included in two layers of upper and lower layers in one phase belt is replaced with a coil piece of an adjacent different phase.

Hereinafter, embodiments will be described with reference to the drawings.

Before describing each embodiment in detail, first, a technique which is a fundamental will be described below.
(Integral-Number Slot and Fractional-Number Slot)

The number of slots per pole per phase Nspp of the armature windings of a synchronous machine can be calculated by the following formula.

Nspp=(number of all slots of armature)/((number of poles)×(number of phases))=$a+(b/c)$ In general, Nspp is often made in an integral number. However, depending on the size of the iron core of the synchronous machine, there is a limit to the selectable number of slots, hence with an increase in the number of poles, Nspp becomes smaller, and the windings becomes closer from the distributed windings to the concentrated windings, and hence the no-load voltage waveform tends to become worse. Accordingly, fractional-number slots which do not make Nspp an integral number are adopted in some cases. In the following, it is assumed that θm is a machine angle, p is the number of pole pairs, and ω is an angular frequency.

Magnetic flux density $B_g(\theta_m, \omega t)$ in the air gap of the synchronous machine is expressed by the sum total of the magnetic flux density $B_{gf}(\theta_m, \omega t)$ based on the field magnetomotive force, and magnetic flux density $B_{ga}(\theta_m, \omega t)$ based on the armature magnetomotive force as shown by following formula (1).

$$B_g(\theta_m,\omega t)=B_{gf}(\theta_m,\omega t)+B_{ga}(\theta_m,\omega t) \quad (1)$$

Here, regarding the magnetic flux based on the field, the magnetomotive force of each pole is identical, and hence a harmonic such as even harmonics, sub-synchronous (or fractional) harmonics or the like to be described later are not generated. The magnetic density $B_{gf}(\theta_m, \omega t)$ based on the field magnetomotive force of this case is expressed by following formula (2).

$$B_{gf}(\theta_m,\omega t)=B_{gf1}\cos(p\theta_m-\omega t)+B_{gf3}\cos(3p\theta_m+3\omega t)+ B_{gf5}\cos(5p\theta_m+5\omega t) \quad (2)$$

On the other hand, the magnetic flux based on the armature magnetomotive force is, in the case of the integral-number slots, the number of coils per each pole is identical, and hence, although even harmonics or sub-synchronous (or fractional) harmonics are not caused in the armature magnetomotive force, in the case of the fractional-number slots, the number of coils per each pole per each phase is not identical, and even harmonics or sub-synchronous (or fractional) harmonics are caused in the armature magetomotive force. The even harmonic is a harmonic based on a wavelength ½ times the fundamental wave. The sub-synchronous (or fractional) harmonic is a harmonic based on a wavelength n times (n: an integral number greater than or equal to 4) the fundamental wave.

When the denominator of Nspp is 2, even harmonics are caused in the armature magnetomotive force, and when the denominator of Nspp is an integral number greater than or equal to 4, sub-synchronous (or fractional) harmonics are caused in the armature magnetomotive force.

(Even Harmonics in Fractional-Number Slot)

First, a case where the denominator of Nspp is 2 will be described below by taking an armature having 4 poles, and 54 slots as an example. Nspp is expressed by following formula (3).

$$N_{spp} = \frac{54}{4 \times 3} \quad (3)$$
$$= 4\frac{1}{2}$$

Here, a harmonic of 3n times becomes 0 by being combined with three-phase magnetomotive force, and hence, in the case of the fractional-number slots, the flux density $B_{ga}(\theta_m, \omega t)$ based on the armature magnetomotive force is expressed by following formula (4).

$$B_{ga}(\theta_m,\omega t)=B_{ga1}\cos(2\theta_m-\omega t)+B_{ga2}\cos(4\theta_m+\omega t)+ B_{ga4}\cos(8\theta_m-\omega t)+B_{ga5}\cos(10\theta_m+\omega t)+B_{ga7}\cos(14\theta_m-\omega t) \quad (4)$$

Further, only the temporal fundamental wave component is considered. Here, when $B_1$ is defined as $B_{gf1}+B_{ga1}$ ($B_1=B_{gf1}+B_{ga1}$), formula (1) is expressed as shown by following formula (5).

$$B_g(\theta_m,\omega t)=B_1\cos(2\theta_m-\omega t)+B_{ga2}\cos(4\theta_m+\omega t)+B_{ga4}\cos(8\theta_m-\omega t)+B_{ga5}\cos(10\theta_m+\omega t)+B_{ga7}\cos(14\theta_m-\omega t) \quad (5)$$

In the above formula, $B_{ga2}$ and $B_{ga4}$ are even harmonics peculiar to a case where fractional-number slots are adopted.

Next, the electromagnetic force will be described below.

The energy in the air gap is the binding force between the stator (armature) and rotor (field), and is expressed by following formula (6). It should be noted that $\mu_0$ in formula (6) indicates a constant.

$$F(\theta_m, t) = \frac{1}{2\mu_0} B_g^2(\theta_m, t) \quad (6)$$
$$= \frac{1}{2\mu_0}(B_{gf}(\theta_m, t) + B_{ga}(\theta_m, t))^2$$

An AC component Fa of the electromagnetic force is proportional to an AC component of the square of the composite flux. Here, on the basis of the condition $B_1 \gg B_{ga2}, B_{ga4}, B_{ga5}, B_{ga7}$, when the terms other than the terms multiplied by $B_1$ are omitted, following formula (7) is obtained.

$$F_{ac}(\theta_m, \omega t) = \frac{B_1^2}{4\mu_0}\cos(4\theta_m - 2\omega t) + \\ \frac{B_1 B_{ga2}}{2\mu_0}\cos(2\theta_m + 2\omega t) + \frac{B_1 B_{ga4}}{2\mu_0}\cos(10\theta_m - 2\omega t) + \\ \frac{B_1 B_{ga5}}{2\mu_0}\cos(8\theta_m + 2\omega t) + \frac{B_1 B_{ga7}}{2\mu_0}\cos(16\theta_m - 2\omega t) + \ldots = \\ F_{a2}\cos(4\theta_m - 2\omega t) + F_{a1}\cos(2\theta_m + 2\omega t) + F_{a5}\cos(10\theta_m - 2\omega t) + \\ F_{a4}\cos(8\theta_m + 2\omega t) + F_{a8}\cos(16\theta_m - 2\omega t) + \ldots \quad (7)$$

That is, the electromagnetic force peculiar to the case where fractional-number slots are adopted corresponds to $F_{a1}\cos(2\theta_m+2\omega t)$, and $F_{a5}\cos(10\theta_m-2\omega t)$ resulting from the even-ordered flux densities of formula (5).

(Sub-Synchronous (or Fractional) Harmonics in Fractional-Number Slot)

Next, a case where the denominator of Nspp is an integral number greater than or equal to 4 will be described below by taking 10 poles, and 54 slots as an example. In this case, Nspp is expressed by following formula (8).

$$N_{spp} = \frac{54}{4 \times 3} \quad (8)$$
$$= 1\frac{4}{5}$$

In the case of 10 poles, and 54 slots, the denominator of Nspp is 5, and hence, as shown in FIG. 1, sub-synchronous (or fractional) harmonics D in which the phase changes by π within 5 poles, i.e., a sub-synchronous (or fractional) harmonic D which is a ⅕ harmonic having a wavelength 5 times the fundamental wave B occurs. Thereby, magnetomotive force resulting from a harmonic based on a ⅕ harmonic is generated. The flux density $B_g(\theta_m, \omega t)$ of this case is expressed by following formula (9).

$$B_g(\theta_m, \omega t) = B_1\cos(5\theta_m - \omega t) + B_{ga\frac{1}{5}}\cos(\theta_m + \omega t) + B_{ga\frac{7}{5}}\cos(7\theta_m + \omega t) \quad (9)$$

It should be noted that the electromagnetic force is identical to aforementioned formula (7).

When a frequency of the electromagnetic force based on the occurring harmonic, and fundamental wave is close to the natural vibration frequency of the armature core, resonance is brought about, thereby causing core vibration.

That is, when fractional-number slots are applied to a multipolar machine (generally a machine with the number of poles of which is 8 or more) having a larger number of poles, sub-synchronous (or fractional) harmonics associated with a case where the denominator of Nspp is 4 or more are liable to occur, and when a frequency of the electromagnetic force based on such a sub-synchronous (or fractional) harmonic, and fundamental wave is close to the natural vibration frequency of the armature core (for example, a 7/5 harmonic having a wavelength 5/7 times the fundamental wave), resonance is brought about, this being the cause of vibration of the armature core.

In each of following embodiments, the above-mentioned problem is solved by a method of reducing a specific harmonic of the magnetomotive force which becomes a cause of the iron-core vibration.

First Embodiment

First, armature windings of a synchronous machine according to a first embodiment will be described below with reference to FIG. 2A, FIG. 2B, FIG. 3A, and FIG. 3B while a first conventional example is compared with the first embodiment.

Figure 2A:
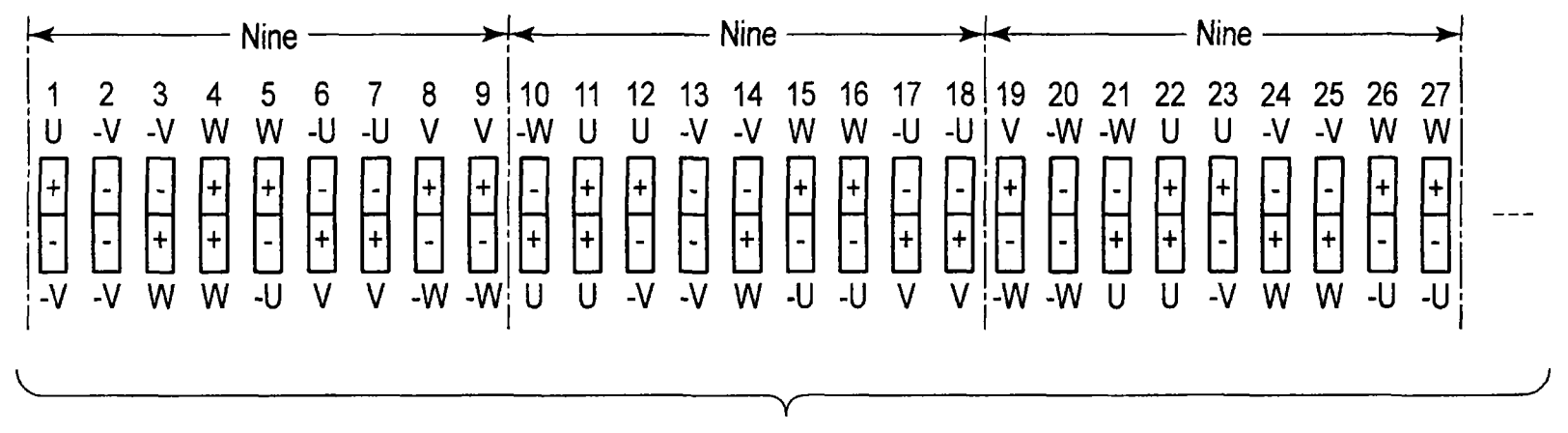
Figure 2B:
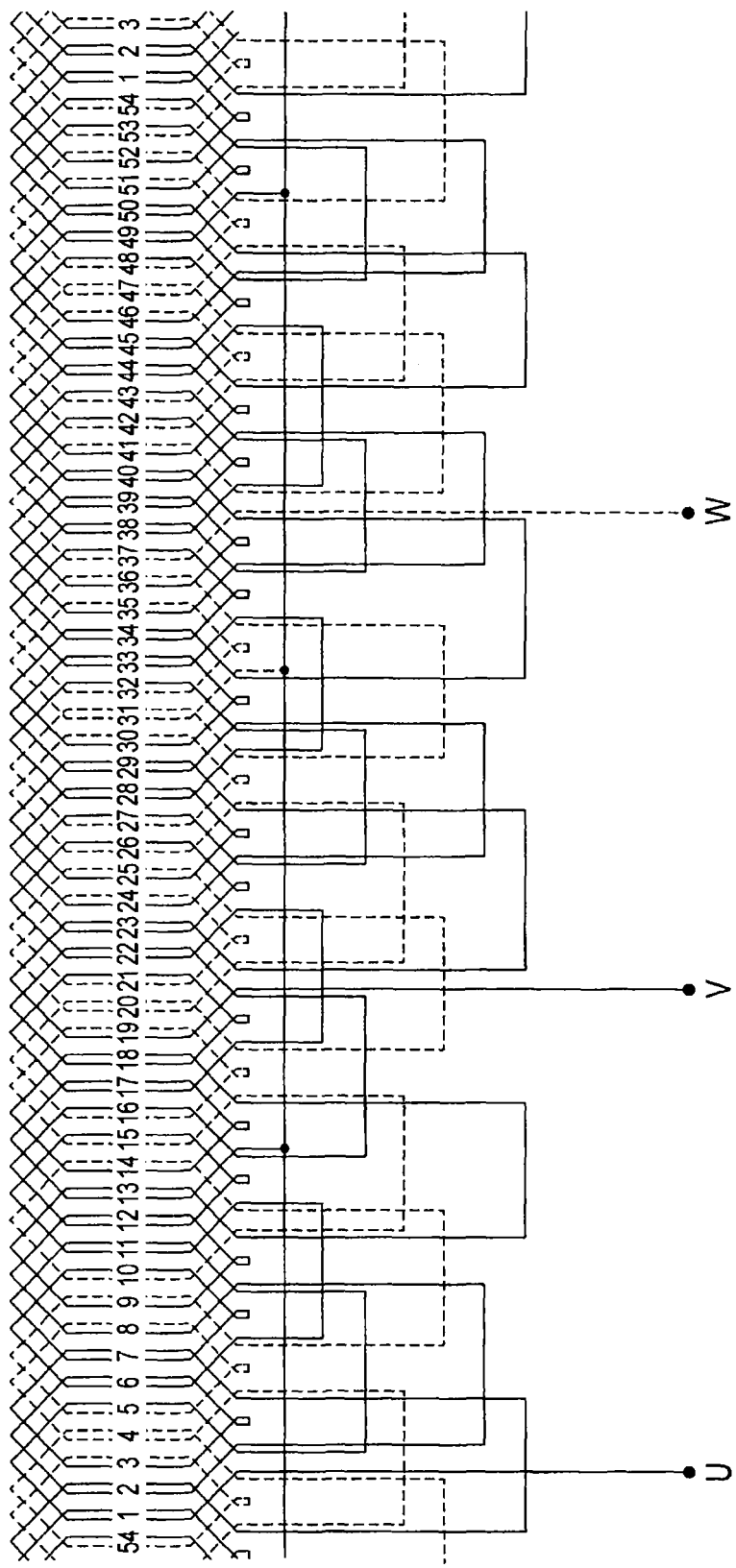
Figure 3A:
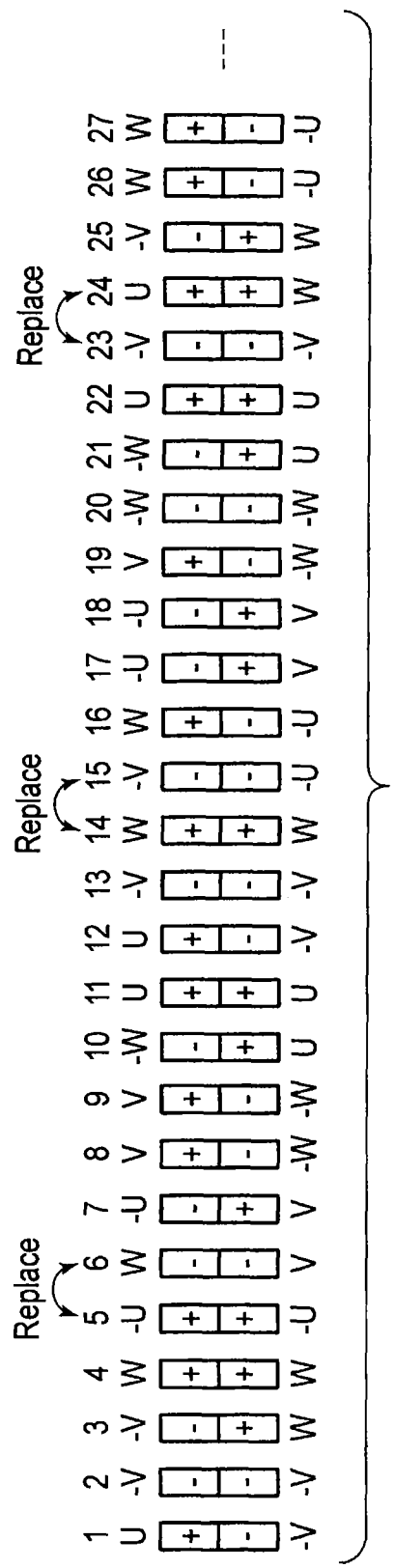
FIG. 3A and FIG. 3B are views showing coil arrangement and winding connection of the armature windings according to a first embodiment.
Figure 3B:
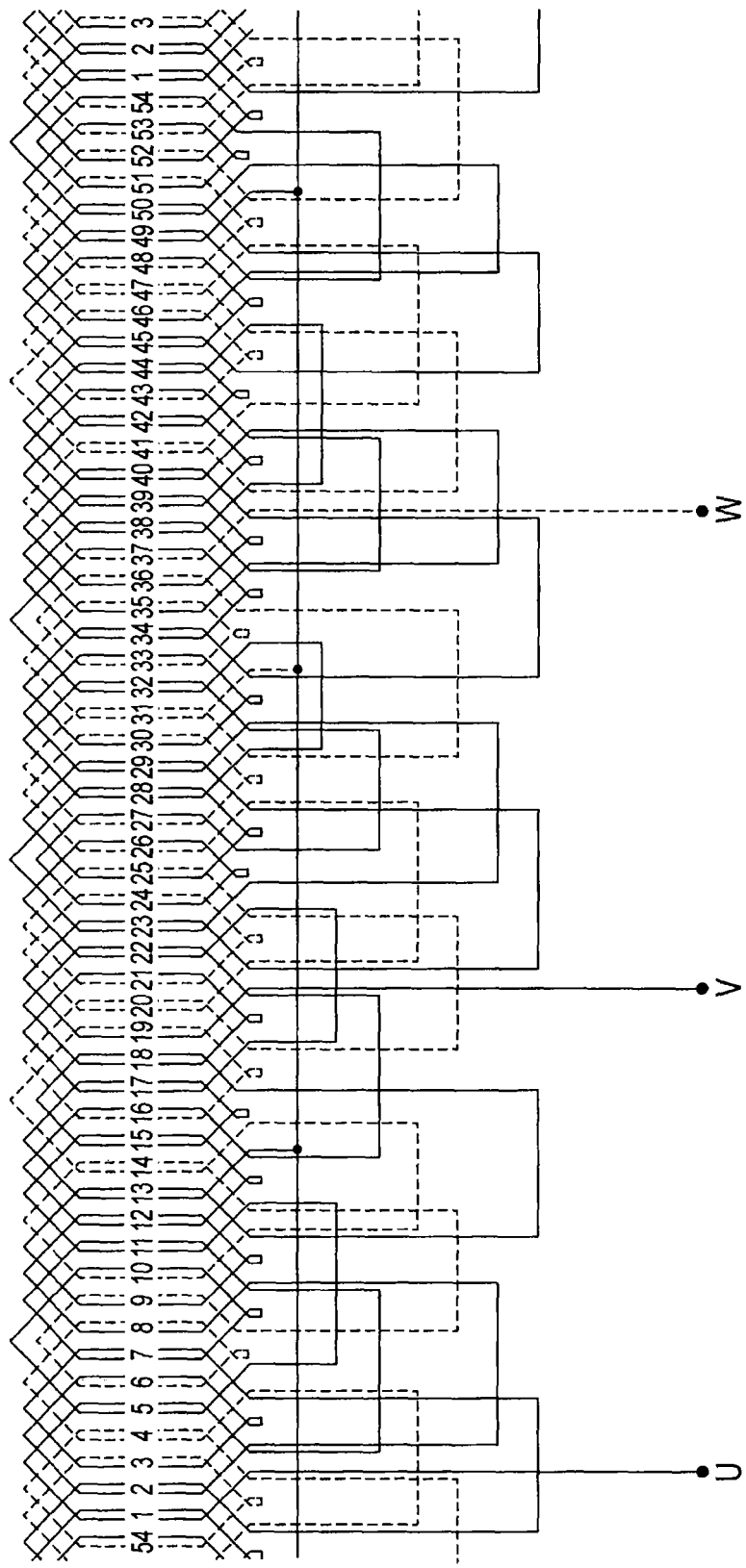

FIG. 2A shows part of coil arrangement of armature windings according to a first conventional example, and FIG. 2B shows the winding connection thereof. On the other hand, FIG. 3A shows part of coil arrangement of armature windings according to the first embodiment, and FIG. 3B shows the winding connection thereof. Each numeral in each view indicates a slot number (or a coil number).

It should be noted that in FIG. 2A and FIG. 3A, coil pieces positioned on the upper side in each view correspond to upper coil pieces, and coil pieces positioned on the lower side in each view correspond to lower coil pieces. Further, in FIG. 2B and FIG. 3B, of two wires passing through a position of each slot number, a left-side wire corresponds to an upper coil piece, and a right-side wire corresponds to a lower coil piece.

Each of armature windings treated in the first embodiment, and first conventional example is used in a multipolar machine to be applied to a rotating electrical machine of a hydroelectric power generation system or the like, and is an armature winding in which a 3-phase winding of two layers including upper and lower layers is constituted of phase belts having an electrical phase difference of 60° in between, pairs of upper coil pieces and lower coil pieces are contained in slots provided in the armature core, the number of slots Nspp per pole per phase includes a fractional number, and a denominator thereof is an integral number greater than or equal to 4. Here, although a case where fractional-number slots are constituted of a 3-phase, 10 pole, 54-slot configuration, and Nspp is "1+4/5" is exemplified, the example is not limited to this.

Further, as shown in FIG. 2A and FIG. 3A, regarding upper coil pieces, one or two coil pieces per phase are arranged such that a phase patter of "U, –V, W, –U, V, –W" is repetitively arranged in the circumferential direction of the armature core. The same applies to the lower coil piece.

However, in the first conventional example, consecutive nine coil pieces (1×5+4=9) in each phase are arranged such that a group of the nine coil pieces in each phase has an electrical phase difference of 180°, and a pattern of the number of coil pieces "1, 2, 2, 2, 2" in each phase is repetitively arranged as shown in FIG. 2A, and Table 1.

TABLE 1

| U | –V | W | –U | V | –W |
|---|----|---|----|---|----|
| 1 | 2  | 2 | 2  | 2 | 1  |
| 2 | 2  | 2 | 2  | 1 | 2  |
| 2 | 2  | 2 | 1  | 2 | 2  |
| 2 | 2  | 1 | 2  | 2 | 2  |
| 2 | 1  | 2 | 2  | 2 | 2  |

On the other hand, in the first embodiment, unlike the coil arrangement of the first conventional example, coil arrangement is made such that at least one coil piece in either of the upper coil pieces or lower coil pieces included in the two layers of the upper and lower layers in one phase belt is replaced with a coil piece of an adjacent different phase.

More specifically, the coil arrangement is as shown in FIG. 3A, and Table 2.

TABLE 2

| U | –V | W | –U | V | –W |
|---|----|---|----|---|----|
| 1 | 2  | 2 | 2  | 2 | 1  |
| 2 | 2  | 2 | 2  | 1 | 2  |
| 2 | 2  | 2 | 1  | 2 | 2  |
| 2 | 2  | 1 | 2  | 2 | 2  |
| 2 | 1  | 2 | 2  | 2 | 2  |

That is, in contrast to the coil arrangement of the first conventional example shown in FIG. 2A, and Table 1, in FIG. 3A, and Table 2, the following coil piece replacement is carried out.

replacing the upper coil piece (W) of the slot number 5 with the upper coil piece (–U) of the slot number 6 replacing the upper coil piece (–V) of the slot number 14 with the upper coil piece (W) of the slot number 15 replacing the upper coil piece (U) of the slot number 23 with the upper coil piece (–V) of the slot number 24 replacing the upper coil piece (–W) of the slot number 32 with the upper coil piece (U) of the slot number 33 (not shown)

replacing the upper coil piece (V) of the slot number 41 with the upper coil piece (–W) of the slot number 42 (not shown)

replacing the upper coil piece (–U) of the slot number 50 with the upper coil piece (V) of the slot number 51 (not shown)

Consequently, parts at which coil piece replacement is carried out are arranged at even intervals in the circumferential direction of the armature core.

Concomitantly with such coil piece replacement, the method of winding connection also changes.

For example, in the winding connection of the first conventional technique shown in FIG. 2B, the upper coil piece (W) of the slot number 4 is connected to the lower coil piece (–W) of the slot number 8, is thereafter connected to the upper coil piece (W) of the slot number 5, and is thereafter connected to the lower coil piece (–W) of the slot number 9.

On the other hand, in the winding connection of the first embodiment shown in FIG. 3B, the upper coil piece (W) of the slot number 4 is connected to the lower coil piece (–W) of the slot number 8, is thereafter connected to the upper coil piece (W) of the slot number 6, and is thereafter connected to the lower coil piece (–W) of the slot number 9.

In Table 3, a comparison between a ratio (to the fundamental wave) of each harmonic occurring in the first conventional example (conventional fractional-number slots), and ratio of each harmonic occurring in the first embodiment is shown.

TABLE 3

|  | Number of slots | Harmonic order [pu] | | |
|---|---|---|---|---|
|  |  | 1/5 harmonic | 7/5 harmonic | Fundamental |
| Conventional | 54 | 0.122 | 0.046 | 1.00 |

TABLE 3-continued

| | | Harmonic order [pu] | | |
|---|---|---|---|---|
| | Number of slots | 1/5 harmonic | 7/5 harmonic | Fundamental |
| fractional-number slot First embodiment | 54 | 0.140 | 0.010 | 1.00 |

As can be seen from Table 3, in the first embodiment, unlike the first conventional example (conventional fractional-number slots), the ratio of the "7/5 harmonic" having a wavelength relatively close to the fundamental wave is largely lowered. Regarding the "7/5 harmonic", the frequency of the electromagnetic force based on the "7/5 harmonic", and fundamental wave is close to the natural vibration frequency of the armature core, and hence lowering of the "7/5 harmonic" greatly contributes to reduction in the core vibration.

In general, in the case where the number Nspp of slots per pole per phase is small as in the case of a multipolar machine, when each of an upper coil piece and lower coil piece in a phase band is replaced with a coil piece in an adjacent different phase, the winding factor largely changes, and the utilization factor of the magnetic flux is lowered. In this case, the fundamental wave flux amount of a synchronous machine is inversely proportional to the winding factor, and hence although the harmonics can be reduced, the winding factor is lowered. In the case of the same voltage, the flux amount becomes larger, and hence the need to enlarge the body structure of the armature core in order to secure the flux path arises. Conversely, in the first embodiment, by replacing only one of the upper coil piece and lower coil piece in the phase belt with a coil piece in an adjacent different phase, the utilization factor of the flux can be prevented from being lowered, and hence there is no need to enlarge the body structure of the armature core, and it becomes possible to reduce the specific harmonic which becomes the cause of the iron core vibration while preventing the fundamental wave flux from being reduced.

Second Embodiment

Next, armature windings of a synchronous machine according to a second embodiment will be described below with reference to FIG. 4A, FIG. 4B, FIG. 5A, and FIG. 5B while a second conventional example is compared with the second embodiment.

In the following, descriptions of parts common to the first embodiment are omitted, and parts different from the first embodiment will mainly be described.

Figure 4A:
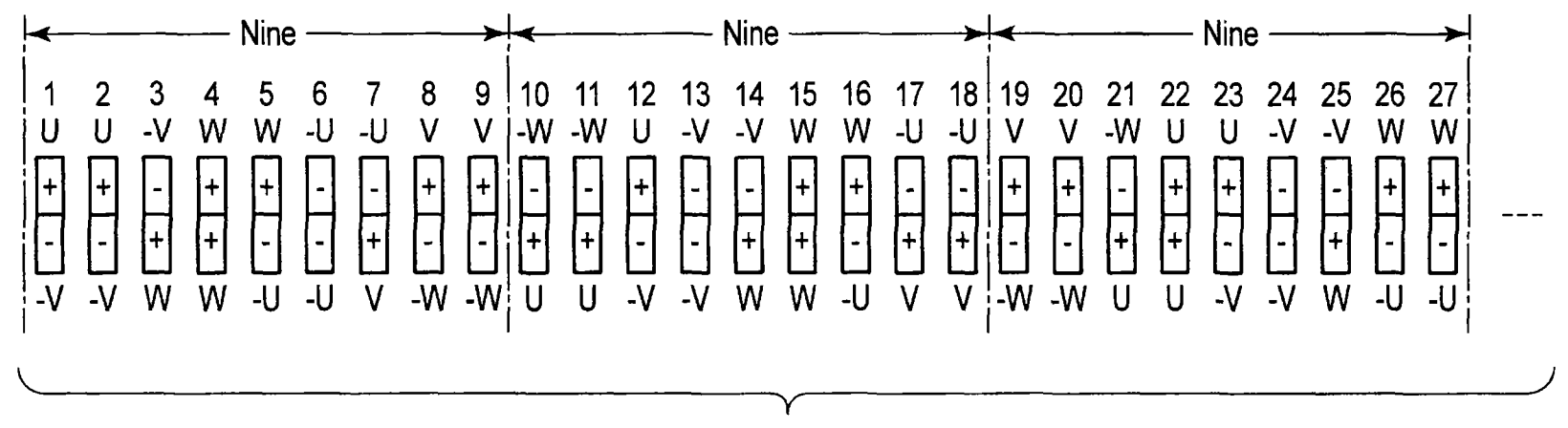
Figure 4B:
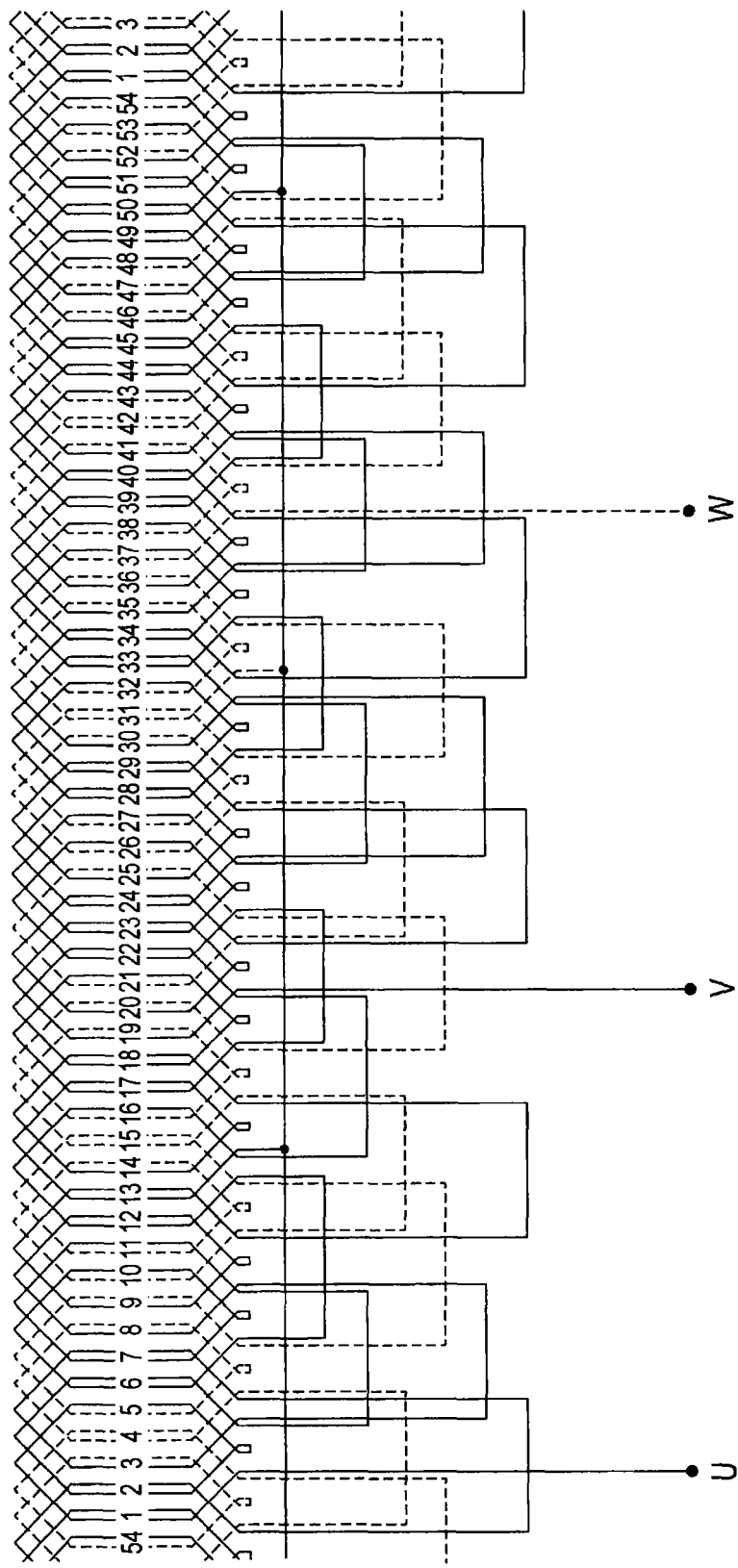
Figure 5A:
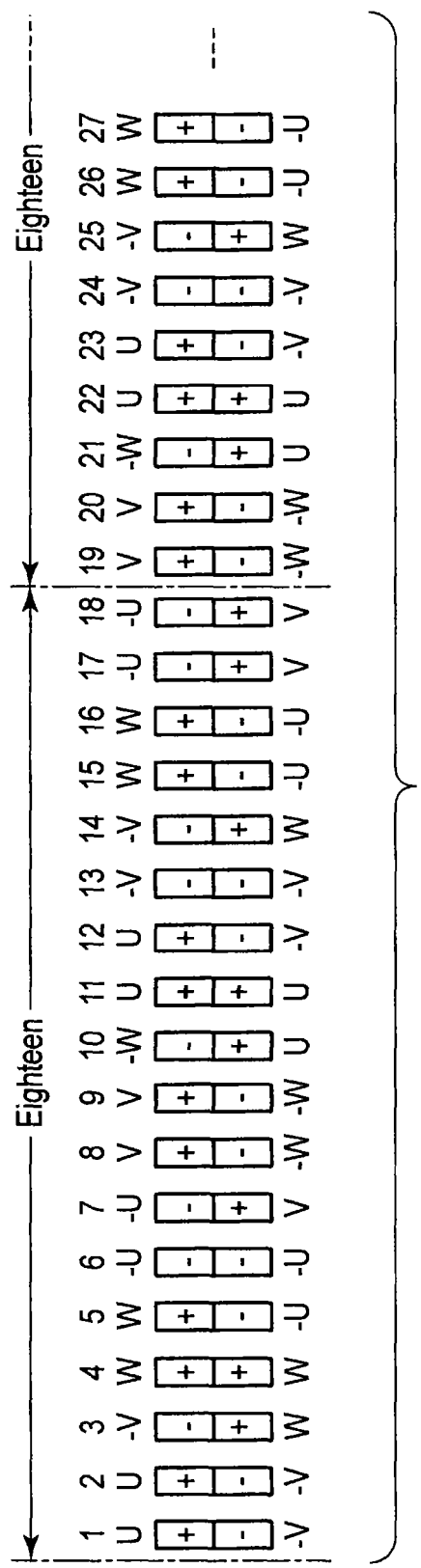

FIG. 4A shows part of coil arrangement of armature windings according to the second conventional example, and FIG. 4B shows the winding connection thereof. On the other hand, FIG. 5A shows part of coil arrangement of armature windings according to the second embodiment, and FIG. 5B shows the winding connection thereof. Each numeral in each view indicates a slot number (or a coil number).

It should be noted that in FIG. 4A and FIG. 5A, coil pieces positioned on the upper side in each view correspond to upper coil pieces, and coil pieces positioned on the lower side in each view correspond to lower coil pieces. Further, in FIG. 4B and FIG. 5B, of two wires passing through a position of each slot number, a left-side wire corresponds to an upper coil piece, and a right-side wire corresponds to a lower coil piece.

As in the cases of the aforementioned first embodiment, and first conventional example, each of armature windings treated in the second embodiment, and second conventional example is used in a multipolar machine to be applied to a rotating electrical machine of a hydroelectric power generation system or the like, and is an armature winding in which a 3-phase winding is constituted of two layers including upper and lower layers in phase belts having an electrical phase difference of 60° in between, pairs of upper coil pieces and lower coil pieces are contained in slots provided in the armature core, the number of slots Nspp per pole per phase includes a fractional number, and a denominator thereof is an integral number greater than or equal to 4. Here, although a case where fractional-number slots are constituted of a 3-phase, 10 pole, 54-slot configuration, and Nspp is "1+4/5" is exemplified, the example is not limited to this.

Further, as shown in FIG. 4A and FIG. 5A, regarding the upper coil pieces, one or two coil pieces per phase are arranged such that a phase patter of "U, −V, W, −U, V, −W" is repetitively arranged in the circumferential direction of the armature core. The same applies to the lower coil piece.

However, in the second conventional example, consecutive nine coil pieces (=1×5+4=9) in each phase are arranged such that a group of the nine coil pieces in each phase has an electrical phase difference of 180°, and a pattern of the number of coil pieces in each phase "2, 1, 2, 2, 2" is repetitively arranged as shown in FIG. 2A, and Table 4.

TABLE 4

| U | −V | W | −U | V | −W |
|---|---|---|---|---|---|
| 2 | 1 | 2 | 2 | 2 | 2 |
| 1 | 2 | 2 | 2 | 2 | 1 |
| 2 | 2 | 2 | 2 | 1 | 2 |
| 2 | 2 | 2 | 1 | 2 | 2 |
| 2 | 2 | 1 | 2 | 2 | 2 |

On the other hand, in the second embodiment, unlike the coil arrangement of the second conventional example, coil arrangement is carried out such that a group of 18 consecutive coil pieces in each phase has an electrical phase difference a plurality of times 180° (twice in this case), and a pattern of the number of coil pieces "2, 1, 2, 2, 2, 1, 2, 2, 2" in each phase is repetitively arranged as shown in FIG. 2A, and Table 5.

That is, in the second embodiment, a group of coils forming a pattern as a group is formed as an expanded group which is further expanded as compared with the coil arrangement of the second conventional example.

More specifically, the coil arrangement is as shown in FIG. 5A, and Table 5.

TABLE 5

| U | −V | W | −U | V | −W |
|---|---|---|---|---|---|
| 2 | 1 | 2 | 2 | 2 | 1 |
| 2 | 2 | 2 | 2 | 2 | 1 |
| 2 | 2 | 2 | 1 | 2 | 2 |
| 2 | 2 | 2 | 1 | 2 | 2 |
| 2 | 1 | 2 | 2 | 2 | 2 |

That is, unlike the coil arrangement of the second conventional example shown in FIG. 4A, and Table 4, in FIG. 5A, and Table 5, the following coil change is carried out.

changing the phase of the upper coil piece of the slot number 11 from "−W" to "U"

changing the phase of the upper coil piece of the slot number 29 from "−U" to "V" (not shown)

changing the phase of the upper coil piece of the slot number 47 from "−V" to "W" (not shown)

changing the phase of the lower coil piece of the slot number 15 from "W" to "−U"

changing the phase of the lower coil piece of the slot number 33 from "U" to "−V" (not shown)

changing the phase of the lower coil piece of the slot number 51 from "V" to "−W" (not shown)

Consequently, parts at which changing of the phase of the coil piece has been carried out are arranged at even intervals in the circumferential direction of the armature core.

Concomitantly with such coil change, the method of winding connection also changes.

It should be noted that parts at which changing of the winding connection has been carried out are obvious from comparison between FIG. 4A and FIG. 5A, and hence the description is omitted here.

In Table 6, a comparison between a ratio (to the fundamental wave) of each harmonic occurring in the second conventional example (conventional fractional-number slots), and ratio of each harmonic occurring in the second embodiment is shown.

TABLE 6

| | Number of slots | Harmonic order [pu] | | |
| --- | --- | --- | --- | --- |
| | | 1/5 harmonic | 7/5 harmonic | Fundamental |
| Conventional fractional-number slot | 54 | 0.122 | 0.046 | 1.00 |
| Second embodiment | 54 | 0.098 | 0.011 | 1.00 |

As can be seen from Table 6, in the second embodiment, unlike the second conventional example (conventional fractional-number slots), the ratio of the "7/5 harmonic" is largely lowered. Regarding the "7/5 harmonic", the frequency of the electromagnetic force based on the "7/5 harmonic", and fundamental wave is close to the natural vibration frequency of the armature core, and hence lowering of the "7/5 harmonic" greatly contributes to reduction in the core vibration.

When the method of forming an expanded group which is a group of coils forming a pattern as a group, and is further expanded is used as in the second embodiment too, it is possible to obtain the same advantage as the first embodiment.

As has been described above in detail, according to the embodiments, it is possible to reduce the specific harmonic while preventing the fundamental wave flux from being reduced, and solve the problem occurring when fractional-number slots are employed such as vibration/noise, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. Armature windings of a rotating electrical machine, in which a 3-phase winding of two layers including upper and lower layers is constituted of phase belts having an electrical phase difference of 60° in between, comprising:

pairs of upper coil pieces and lower coil pieces contained in slots of an armature core, the number of slots per pole per phase being a fractional number, and a denominator thereof being an integral number greater than or equal to 4, wherein coil arrangement is carried out such that only one of an upper coil piece and a lower coil piece included in the two layers of upper and lower layers in one phase belt is replaced with a coil piece in an adjacent different phase, wherein the rotating electrical machine has at least eight poles.

2. The armature windings of a rotating electrical machine according to claim 1, wherein coil piece replacement is carried out such that a specific harmonic occurring in the armature magnetomotive force is reduced.

3. The armature windings of a rotating electrical machine according to claim 1, wherein coil piece replacement is carried out such that a specific harmonic based on a wavelength n times (n: an integral number greater than or equal to 4) a fundamental wave, and occurring in the armature magnetomotive force is reduced.

4. The armature windings of a rotating electrical machine according to claim 1, wherein parts at which coil piece replacement is carried out are arranged at even intervals in a circumferential direction of the armature core.

5. Armature windings of a rotating electrical machine, in which a 3-phase winding of two layers including upper and lower layers is constituted of phase belts having an electrical phase difference of 60° in between, comprising:

pairs of upper coil pieces and lower coil pieces contained in slots of an armature core, the number of slots per pole per phase being a fractional number, and a denominator thereof being an integral number greater than or equal to 4, wherein an arrangement pattern in which a group of coil pieces in each phase includes an electrical phase difference a plurality of times 180° is repetitively arranged in a circumferential direction of the armature core, wherein the rotating electrical machine has at least eight poles.

6. The armature windings of a rotating electrical machine according to claim 5, wherein parts at which changing of the phase of the coil piece is carried out are arranged at even intervals in a circumferential direction of the armature core.

* * * * *